United States Patent [19]

Coleman et al.

[11] 3,926,786

[45] Dec. 16, 1975

[54] PRODUCTION OF LUBRICATING OILS

[75] Inventors: Richard L. Coleman, Port Arthur; Billy H. Cummins; William B. Ashton, both of Nederland, all of Tex.

[73] Assignee: Texaco Inc., New York, N.Y.

[22] Filed: Dec. 21, 1973

[21] Appl. No.: 427,155

Related U.S. Application Data

[63] Continuation of Ser. No. 308,068, Nov. 20, 1972, abandoned.

[52] U.S. Cl. ................................ 208/264; 208/18
[51] Int. Cl.² .......................................... C10G 23/02
[58] Field of Search ............. 208/18, 143, 111, 264

[56] References Cited
UNITED STATES PATENTS

| | | | |
|---|---|---|---|
| 3,078,238 | 2/1963 | Beuther et al. | 208/264 |
| 3,393,148 | 7/1968 | Bertolacini et al. | 208/264 |
| 3,438,887 | 4/1969 | Morris et al. | 208/18 |
| 3,493,493 | 2/1970 | Henke et al. | 208/264 |
| 3,539,498 | 11/1970 | Morris et al. | 208/111 |
| 3,549,520 | 12/1970 | Morris | 208/264 |
| 3,654,133 | 4/1972 | Olson | 208/18 |
| 3,702,817 | 11/1972 | Cummins et al. | 208/18 |

Primary Examiner—Herbert Levine
Attorney, Agent, or Firm—T. H. Whaley; C. G. Ries; Robert Knox, Jr.

[57] ABSTRACT

Improved lubricating oils are prepared by contacting the oil with a supported hydrogenation catalyst in which the support comprises alumina, mordenite in hydrogen form and halogen.

5 Claims, No Drawings

PRODUCTION OF LUBRICATING OILS

This is a continuation of application Ser. No. 308,068, filed Nov. 20, 1972, now abandoned.

This invention relates to the production of improved lubricating oils. More particularly, it is concerned with the production of base oils of high viscosity index suitable for blending into multigrade lubricating oils, automatic transmission fluids and other speciality oil where a high viscosity index is desirable.

Various steps for the production of lubricating oils such as distillation, solvent refining, solvent dewaxing, acid treating and clay contacting are well known. When a residual oil such as an atmospheric residuum is to be processed a preliminary deasphalting step is also generally required.

In the processing steps listed above, distillation is employed as a means of separating a crude petroleum oil into fractions of various viscosities, solvent refining with, for example, either furfural or N-methyl-2-pyrrolidone is used as a means of removing aromatics thereby improving the viscosity index. Solvent dewaxing using, for example, a mixture of methyl ethyl ketone and toluene is used to lower the pour point and clay contacting is used generally as a final step to improve the color and to neutralize the oil after it has been acid treated to improve color, oxidation stability and heat stability.

In a conventional lube oil refining process, the solvent extraction or, as it is frequently called, solvent refining for the purpose of removing aromatics and increasing the viscosity index is carried out first to recover about 45–90 percent of the charge as solvent refined oil and to reject about 10–55 percent of the charge as dark viscous extract. Since the extract amounts to a relatively high percentage of the charge and is not suitable for upgrading into a high quality lubricating oil, solvent extraction results in a considerable loss in yield of the final product lubricating oil. It has been proposed to substitute hydrogenation for improvement of the viscosity index. However, to a considerable extent the hydrogen treatment has not been completely satisfactory. It is therefore an object of this invention to provide an improved process for the hydrogenation of lubricating stocks to improve the yield and viscosity index.

According to our invention, lubricating oils of improved viscosity index are prepared by contacting a lubricating stock in the presence of hyrogen with a catalyst comprising an iron group metal or compound thereof and a Group VI metal or compound thereof supported on a refractory amorphous inorganic oxide containing from about 1–50 percent by weight mordenite in hydrogen form and also containing from about 0.1–5 percent by weight fluorine.

The crude oil charge stocks used in the process of the present invention are wax distillates or deasphalted residua. By wax distillates is meant lubricating oil fractions obtained directly by the distillation of a crude petroleum oil and which have not been subjected to any refining treatment. By deasphalted residua is meant lube stocks which have been obtained by subjecting a residual oil such as an atmospheric or vacuum residuum to a deasphalting treatment with a deasphalting agent such as a low molecular weight alkane, e.g., propane, or with furfural or N-methyl-2-pyrrolidone. The lubricating oil charge stock is subjected to catalytic hydrogenation. There are three types of hydrogenation reactions available for the treatment of lubricating oils. They are generally referred to as hydrofinishing, hydrotreating and hydrocracking. Of the three, hydrofinishing is the mildest form of treatment and is, as the name implies, a finishing process whereby the lube oil is given a final treatment primarily for color improvement. This treatment effects little change in the molecular structure of the hydrocarbon components of the lube oil and is generally conducted at relatively low pressures and temperatures and relatively high space velocities. It is used as a substitute for clay treating.

Hydrotreating is somewhat more severe than hydrofinishing and generally is carried out at higher temperatures and higher pressures. It is employed primarily for the saturation of aromatic rings and frequently effects a minor reduction in the boiling range of the lube oil. This type of process has been suggested as an alternate to solvent extraction but there are instances where it has not been satisfactory in the yield obtained and the viscosity index improvement.

The other type of hydrogenation, that is, hydrocracking is a rather severe operation and formerly was referred to as destructive hydrogenation. This process generally is carried out at higher temperatures and pressures than the other two hydrogenation reactions with lower space velocities thereby subjecting the oil to higher temperatures for longer residence times. In addition, a catalyst having high cracking activity is used. This type of process effects a considerable amount of carbon to carbon bond rupture with a substantial overall reduction in the average molecular weight of the oil and is accompanied by a considerable increase in the API gravity of the oil.

The hydrogenation step utilized in the process of the present invention is of the intermediate type of reaction referred to as hydrotreating.

Reaction conditions for the hydrotreating reaction when the catalyst is in the form of a fixed bed of particles are temperatures of about 500°–850°F. preferably from 700°–825°F. Pressures may range from 800–3,000 psig with a range of from 1,000–2,500 psig being preferred. The volumetric hourly space velocity may be between 0.1 and 10.0 volumes of oil per volume of catalyst per hour and preferably lies within the range of 0.25 and 2.0. Hydrogen rates may range between about 1,000 and 20,000 scf per barrel of feed, a preferred range being between 2,000 and 12,000 scfb. It will be appreciated that the operating conditions are selected within the above ranges to effect hydrotreating of the lube stock. For example, operating conditions in the approximate mid-point of each of the preferred ranges would be satisfactory to effect the desired reaction. However, it should be understood that the reaction may be varied outside the scope of the present invention by selecting extreme conditions within the above recited ranges. For example, a temperature of 500°F., a pressure of 800 psig, a space velocity of 5 and a hydrogen rate of 2,000 scfb while still falling within the above ranges would effect hydrofinishing rather than hydrotreating. Therefore one skilled in the art can select the particular combination of conditions falling within the above recited ranges which will effect the desired result.

The hydrogen used in the process of the present invention need not necessarily be pure. However, the hydrogen purity should be at least 60 percent and preferably at least 75 percent. Catalytic reformer by-product hydrogen, electrolytic hydrogen and hydrogen produced by the partial oxidation of hydrocarbonaceous material followed by shift conversion and $CO_2$ removal are satisfactory for the purpose of the present invention.

The catalyst used in our invention comprises a hydrogenating component composed of a Group VI metal preferably molybdenum or tungsten or compound thereof and an iron group metal preferably nickel or cobalt or compound thereof on a support comprising a refractory amorphous inorganic oxide containing mordenite in hydrogen form and also containing combined halogen, preferably fluorine. Suitably, the Group VI metal is present in the catalyst composite in an amount between about 5 and 30 percent preferably between about 7 and 20 percent. The iron group metal should be present in an amount between about 1 and 30 percent preferably between 1 and 8 percent. Generally, the catalyst is prepared with the metal in oxide form. However, during the course of the reaction particularly if the lubricating stock contains sulfur, the catalytic metals may be converted at least in part to the sulfide. The metals may also be converted to sulfide form prior to the hydrogenation by contacting the catalyst with a sulfiding agent such as carbon disulfide or hydrogen sulfide preferably diluted with hydrogen.

The support for the metallic hydrogenating component comprises an inorganic amorphous oxide such as alumina or a mixture of alumina containing a minor amount of another amorphous inorganic oxide such as 1–25 percent silica, magnesia or zirconia and also containing 5–30 percent based on the weight of the catalyst composite of mordenite in hydrogen form. In a preferred embodiment the catalyst also contains a small amount, e.g., 0.1–5.0 weight % halogen preferably fluorine, the preferred range being from 0.2–2.0 weight % of the catalyst composite.

Mordenite is a zeolite having a chain type crystalline structure in which a number of chains are linked together into a structural pattern of parallel channels similar to a bundle of tubes. In contrast, type A, type X and type Y synthetic zeolites and faujasite have a three-dimensional crystalline cage structure with 3–4 window type openings per unit cell. Mordenite generally has a silica: alumina mol ratio ranging between 10:1 and 15:1. To prepare the mordenite, it may be treated with dilute acid, for example, 6N HCl or, it may be ion exchanged by reflux with an 18% solution of ammonium chloride for four hours, filtered and washed. This procedure may be repeated three or four times using fresh ammonium chloride solution each time. After the final washing, the mordenite may be slurried twice with distilled water and then filtered. Drying is effected for 12–16 hours at 250°F. To convert ammonium exchanged mordenite to the hydrogen form it should be heated to a temperature of at least about 800°F. and retained at this temperature for 3–4 hours. The mordenite is then in the hydrogen form.

The hydrogen form mordenite may then be impregnated with a solution of the iron group metal compound such as nickel nitrate, dried and then impregnated with a solution of the Group VI metal compound such as ammonium molybdate and dried and preferably calcined at a temperature of about 1,000°F. Fresh alumina gel may be prepared in a manner well known in the art, as for example, by the mixing of ammonium hydroxide and aluminum sulfate. Once a gel has been formed the impregnated hydrogen form mordenite is added thereto and the mixture passed through a colloid mill, dried, crushed and sieved to 40 mesh. The mixture may then be halogenated by treatment with a solution of, for example, aqueous HF to incorporate the halogen into the catalyst composition.

The catalyst, after being shaped into pellets or beads, may be used as a fixed bed, a moving bed or a fluidized bed, a fixed bed being preferred. Reactant flow may be upward or downward, cocurrent or countercurrent. Preferably the oil and hydrogen are passed downwardly through the fixed bed.

The following examples are submitted for illustrative purposes only.

EXAMPLE I

In this example, six catalysts were prepared, three in which the hydrogenating component was palladium and three in which the hydrogenating component was a mixture of cobalt and molybdenum oxides sometimes referred to as cobalt molybdate. In each group of three catalysts, the supports varied in that one was alumina, another was alumina and mordenite in hydrogen form and the third was alumina and mordenite in hydrogen form treated with aqueous HF.

Compositions of the catalysts are listed in Table I, the amounts representing weight % based on the catalyst composite.

TABLE 1

| Catalyst No. | 1 | 2 | 3 | 4 | 5 | 6 |
|---|---|---|---|---|---|---|
| CoO | 1.9 | 2.0 | 1.4 | — | — | — |
| $MoO_3$ | 8.0 | 8.4 | 8.7 | — | — | — |
| Pd | — | — | — | 1.4 | 1.5 | 1.6 |
| Mordenite | — | 15 | 15 | — | 15 | 15 |
| F | — | — | 0.47 | — | — | 0.83 |

In each case, the balance of the catalyst was alumina.

The charge stock was a deasphalted residuum having the following characteristics:

TABLE 2

|  | As is | Dewaxed |
|---|---|---|
| Gravity, °API | 22.2 | 21.3 |
| Viscosity, SUS at 100°F. | 3999 | 5910 |
| Viscosity, SUS at 210°F. | 180.8 | 204 |
| Viscosity Index | 83 | 70 |
| Conradson Carbon Residue, wt. % | 2.27 | — |
| Sulfur, wt. % | 0.414 | — |
| Pour Point, °F. | — | +5 |

The charge was hydrotreated by being passed downwardly with hydrogen through a fixed bed of the catalyst and the hydrotreated lube oil was dewaxed to a 0°F. pour point in a conventional manner using methyl ethyl ketone and toluene. Reaction conditions and properties of the products are listed below:

TABLE 3

| Catalyst No. | 1 | 2 | 3 | 4 | 5 | 6 |
|---|---|---|---|---|---|---|
| Temperature, °F. | 812 | 810 | 810 | 824 | 810 | 810 |
| Space Velocity, v/v/hr | 0.48 | 0.51 | 0.47 | 0.46 | 0.45 | 0.47 |
| Pressure, psig | 1400 | 1400 | 1400 | 1400 | 1400 | 1400 |
| Hydrogen rate, Scfb | 9295 | 7890 | 9300 | 8300 | 9500 | 9550 |
| Product |  |  |  |  |  |  |
| S.D.* yield, wt. % | 81 | 83 | 86 | 82 | 79 | 83 |
| Viscosity Index | 84 | 86 | 98 | 78 | 80 | 79 |

*solvent dewaxing

These data show that the HF treated cobalt molybdate on alumina catalyst containing mordenite was superior to cobalt molybdate on alumina with or without mordenite which had not been HF treated in that a greater solvent dewaxing yield of a higher VI product was obtained. Surprisingly, the noble metal containing catalyst showed little activity even when treated with HF and containing mordenite.

EXAMPLE II

Example I is repeated using catalysts 1 and 3, the reaction conditions being controlled to obtain substantially equivalent yields. Reaction conditions and properties of the dewaxed product are tabulated below:

TABLE 4

| Catalyst No. | 1 | 3 |
|---|---|---|
| Reactor temperature, °F. | 812 | 791 |
| Space velocity, v/v/hr | 0.48 | 0.48 |
| Pressure, psig | 1400 | 1400 |
| Hydrogen, rate, SCFB | 9300 | 8910 |
| Hydrogenation yield, wt. % | 8110 | 80.2 |
| Product | | |
| Viscosity Index | 84 | 88 |

This example shows that catalyst No. 3 produces a superior product in substantially the same yield as catalyst No. 1 even when the hydrogenation is carried out at a 20°F. lower temperature.

EXAMPLE III

In this example which is similar to Example I the charge is a deasphalted residuum having the following characteristics:

TABLE 5

| Gravity, °API | 22.4 |
|---|---|
| Viscosity, SUS at 210°F. | 160 |
| Pour point, °F. | 120+ |
| Total nitrogen, ppm | 1182 |
| Sulfur, wt. % | 0.41 |

The catalyst compositions are tabulated below:

TABLE 6

| Catalyst No. | 7 | 8 | 9 |
|---|---|---|---|
| Nickel | 19.5 | 18.4 | 18.7 |
| Tungsten | 16.8 | 17.3 | |
| Fluorine | — | 1.2 | 1.1 |
| Mordenite (H form) | — | — | 15 |

In each case, alumina comprises the balance of the catalyst.

Reaction conditions and properties of the products for each of three runs similar to those of Example I are listed below:

TABLE 7

| Catalyst No. | 7 | 8 | 9 |
|---|---|---|---|
| Temperature, °F. | 800 | 810 | 800 |
| Space velocity, v/v/hr. | 0.45 | 0.46 | 0.45 |
| Pressure, psig | 1400 | 1400 | 1400 |
| Hydrogen rate, scfb. | 8300 | 8310 | 8300 |
| Hydrogenation yield, wt. % | 79.5 | 80.8 | 81.2 |
| Product | | | |
| Dewaxing yield, wt. % | 83.0 | 86.0 | 88.0 |
| Viscosity index | 81 | 93 | 95 |

Obviously various modifications of the invention as hereinbefore set forth may be made without departing from the spirit and scope thereof, and therefore, only such limitations should be made as are indicated in the appended claims.

We claim:

1. A process for improving the viscosity index of a lubricating oil stock which comprises contacting said lubricating oil stock in the presence of hydrogen under hydrotreating conditions with a catalyst comprising from 1 to 8 wt. % cobalt as the oxide and from 7 to 20 wt. % molybdenum as the oxide on a support comprising alumina, said catalyst containing from about 5 to 30 wt. % mordenite in hydrogen form and also containing from 0.1 to 5 wt. % halogen.

2. The process of claim 1 in which the lubricating stock is a deasphalted residuum.

3. The process of claim 1 in which the crude lubricating oil is a wax distillate.

4. The process of claim 1 in which the hydrotreating conditions are a temperature of 700°–825°F., a pressure of 1,000–2,500 psig, a space velocity between 0.25 and 2.0 and a hydrogen rate of 2,000–12,000 scfb.

5. The process of claim 1 in which the halogen is fluorine.

* * * * *